(12) United States Patent
Berry, Jr.

(10) Patent No.: US 7,717,239 B2
(45) Date of Patent: May 18, 2010

(54) LINEAR DAMPER

(75) Inventor: Toby Berry, Jr., Steger, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/518,758

(22) Filed: Sep. 11, 2006

(65) Prior Publication Data

US 2007/0108004 A1 May 17, 2007

Related U.S. Application Data

(60) Provisional application No. 60/736,209, filed on Nov. 14, 2005.

(51) Int. Cl.
*B65H 59/10* (2006.01)
*F16F 1/00* (2006.01)

(52) U.S. Cl. .................. 188/67; 267/134; 267/37; 188/381

(58) Field of Classification Search .......... 188/67, 188/381; 267/134, 37; 296/37
See application file for complete search history.

(56) References Cited

U.S. PATENT DOCUMENTS

| | | | |
|---|---|---|---|
| 1,458,906 A * | 6/1923 | Napoleon | 188/67 |
| 1,713,515 A | 5/1929 | Bechereau | |
| 3,399,434 A * | 9/1968 | Kelly | 403/194 |
| 3,643,765 A * | 2/1972 | Hanchen | 188/170 |
| 3,703,748 A * | 11/1972 | Kelly | 403/368 |
| 3,877,113 A * | 4/1975 | Reyes | 24/115 M |
| 4,333,649 A * | 6/1982 | Vaughn et al. | 473/540 |
| 4,343,122 A * | 8/1982 | Wlodkowski et al. | 52/223.13 |
| 4,475,722 A | 10/1984 | Paton et al. | |
| 4,613,114 A * | 9/1986 | Paton | 267/202 |
| 4,886,255 A * | 12/1989 | Paton | 267/205 |
| 4,928,451 A * | 5/1990 | Reigstad et al. | 52/223.13 |
| 5,257,680 A * | 11/1993 | Corcoran et al. | 188/129 |
| 5,277,682 A * | 1/1994 | Chen | 482/114 |
| 5,735,511 A | 4/1998 | Stocker et al. | |
| 6,361,459 B1 | 3/2002 | Serkh et al. | |
| 6,412,606 B1 * | 7/2002 | Wu | 188/68 |
| 6,672,575 B2 | 1/2004 | Flower et al. | |
| 2002/0025869 A1 | 2/2002 | Serkh et al. | |

FOREIGN PATENT DOCUMENTS

| | | |
|---|---|---|
| DE | 2310368 | 9/1974 |
| DE | 10127429 | 1/2003 |
| GB | 378410 | 8/1932 |
| WO | WO 0179727 | 10/2001 |

* cited by examiner

*Primary Examiner*—Bradley T King
*Assistant Examiner*—Mahbubur Rashid
(74) *Attorney, Agent, or Firm*—Mark W. Croll; Paul F. Donovan

(57) ABSTRACT

A linear damper includes a conical housing with a friction cone in the housing and a rod extending therethrough and axially moveable relative thereto. The friction cone is axially moveable in the housing and radially expandable and contractible to provide clamping force against a rod when the rod is moved in one axial direction and to relieve clamping force from the rod when the rod is moved in the opposite axial direction.

11 Claims, 2 Drawing Sheets

LINEAR DAMPER

CROSS-REFERENCE TO RELATED APPLICATIONS

The present regular United States Patent Application claims the benefits of U.S. Provisional Application Ser. No. 60/736,209, filed on Nov. 14, 2005.

FIELD OF THE INVENTION

The present invention relates generally to movement dampers and, more particularly, the invention pertains to linear dampers providing high resistance.

BACKGROUND OF THE INVENTION

Movement dampers have many applications and uses for controlling the movement of things. Dampers are used extensively in automotive applications for controlling the movement of glove box doors, cup holders, assist handles and the like. Dampers are often used to control the natural gravitational movement of such components, and to provide a desired feel to the movement of the component being controlled. Uses for dampers in assemblies other than automobiles are also known widely, such as, for example, and not by way of limitation, furniture doors and drawers, appliances, electronic components and other assemblies that have doors, drawers and other components that open or close, move in and out, fold up and down, etc.

It is known to provide center consoles between occupant seats in automobiles, trucks, SUV's and the like. In larger vehicles, the center console can be quite large. Often a door is provided on the top of the console having a hinge at the back and a latch at the front. The door is opened by lifting the front edge upward, thus pivoting the door on the hinge at the back. Such console doors can be both bulky and heavy. Opening can be assisted by springs or the like so that the vehicle occupant is not burdened with lifting the entire weight of the door. Movement dampers can be used to lessen the closing force from the weight of the door, thereby preventing the door or cover from falling shut forcefully, potentially causing damage.

It is often desirable for dampers of this type to work in confined spaces, yet provide significant resistance to the gravitational movement of the object. Limited space can require straight line movement. It is known for damping requirements to be in one direction only, with the damper providing significant resistance in the desired direction and with little or no resistance or damping effect in the opposite direction.

In automobile applications it is desirable for a damper to work effectively without adjustment and to perform satisfactorily through many cycles without failing. Also, it is desirable for the damper to be small and operate effectively in a confined space, to minimize the intrusion in the occupant space of the vehicle.

Accordingly, there is need for improved linear dampers.

SUMMERY OF THE INVENTION

The present invention provides a linear damper with an engaging/disengaging structure whereby the damper provides significant resistance to the movement of a rod in one direction but little resistance to movement of the rod in the opposite axial direction.

In one aspect thereof, the present invention provides a linear damper with a damping assembly and a rod extending through the damping assembly, the damping assembly and the rod configured and arranged for relative axial movement therebetween. The damping assembly includes a friction member therein disposed adjacent the rod. The friction member is actuated by movement of the rod in one axial direction to provide clamping force against the rod and by movement in an opposite axial direction to release clamping force applied against the rod.

In another aspect thereof, the present invention provides a linear damper with a conical housing, a friction cone disposed for axial movement in the housing and a rod extending through the friction cone and the housing. The friction cone is expandable and contractible upon axial movement in the conical housing to apply and release clamping pressure against the rod when relative axial movement occurs between the rod and the housing.

In a further aspect thereof, the present invention provides a linear damper with a damping assembly including a conical housing and a cap defining an axial opening therethrough. A friction cone is disposed in the housing and axially movable therein. The friction cone has an axial slit from one end thereof to the other end thereof. A rod extends through the housing, the cap and the friction cone in the housing, and is movable axially relative to the friction cone.

An advantage of the present invention is providing a linear damper that operates in a small space.

Another advantage of the present invention is providing a linear damper that is simple and inexpensive to manufacture and supply.

Still another advantage of the present invention is providing a linear damper that provides damping in one direction for movement of a rod, with little or no damping in an opposite direction of movement.

Yet another advantage of the present invention is providing a linear damper that requires little or no adjustment and can operate through many cycles of operation.

Other features and advantages of the invention will become apparent to those skilled in the art upon review of the following detailed description, claims and drawings in which like numerals are used to designate like features.

Figure 1:
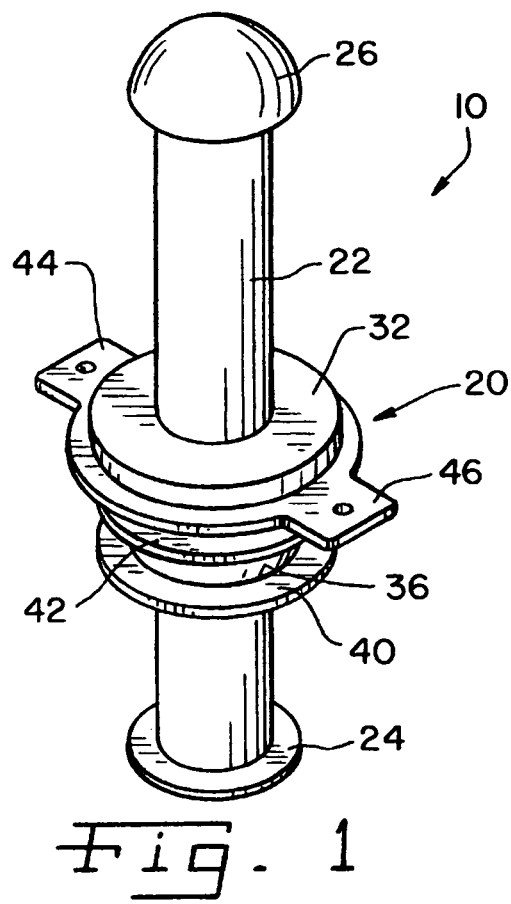
FIG. 1 is a perspective view of a linear damper in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 4:
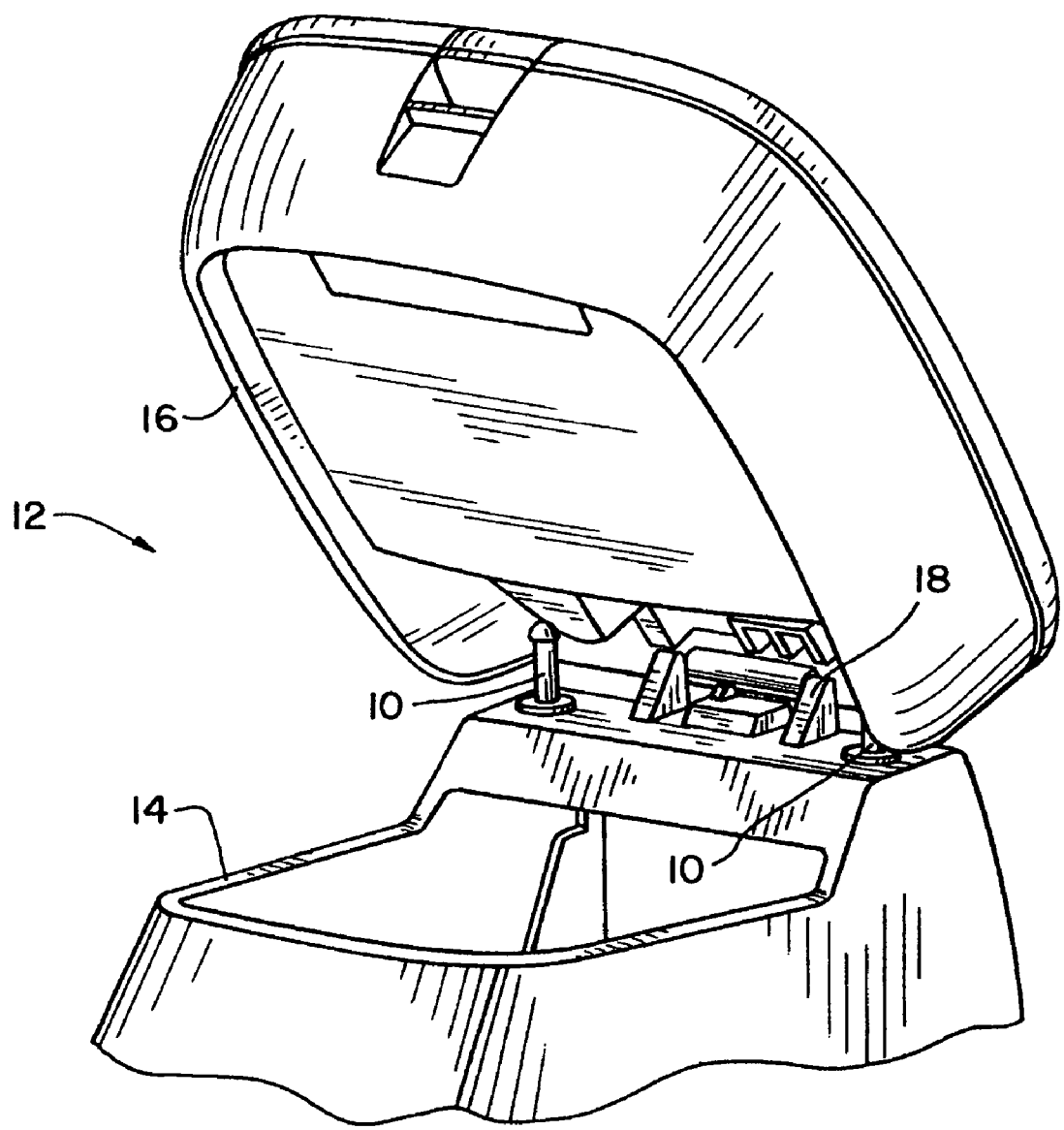
FIG. 4 is a perspective view of an automobile console having linear dampers in accordance with the present invention.

Referring now more specifically to the drawings and to FIG. 1 in particular, numeral 10 designates a linear damper in accordance with the present invention. While linear dampers of the present invention are expected to have a variety of advantageous applications and uses, one particularly advantageous use is to control the closing movement of automobile console doors. FIG. 4 illustrates an automobile console 12 having a base or bin 14 and a cover 16. Cover 16 is connected to bin 14 by a hinge 18. Two linear dampers 10 of the present invention are illustrated to control closing movement of cover 16. Console 12 is merely one example of a suitable use, and the description thereof to follow should not be considered as a limitation on the application and use of the present invention.

Damper 10 includes a damping assembly 20 and a rod 22 axially movable relative to damping assembly 20.

Rod 22 is a substantially linear, elongate body having a base 24 at one end thereof and a head 26 at an opposite end thereof. The shapes, sizes and the like of base 24 and head 26, as well as the length and thickness of rod 22, can be selected for the particular application and use of the present invention. For example, head 26 can be configured with a curved surface as shown for rolling type engagement with a surface pushing thereagainst in a pivotally rotational movement, such as the engagement of damper 10 with cover 16 of console 12. Further, base 24 and head 26 can be configured to limit axial movement of rod 22, so that rod 22 cannot slide completely through damping assembly 20 inadvertently. Rod 22, base 24 and head 26 can be made of injected molded plastic or the like.

Damping assembly 20 includes a housing 30 and a cap 32. A friction cone 34 is disposed in housing 30. Housing 30 and cap 32 can be injection molded plastic or other suitable material, assembled in known manner.

Housing 30 is a conically shaped structure, at least with respect to the inside thereof, and has a tapered sidewall 36 defining an opening 38 at the bottom there of. In the exemplary embodiment, several flanges 40, 42 and/or mounting tabs 44, 46 are provided for installation and securement of damper 10 in its operating position within an assembly, and for providing desired levels of rigidity and strengthening.

Cap 32 closes an open top of the conically shaped housing sidewall 36, and has an opening 50 in alignment with opening 38 in housing 30. Rod 22 is extended slidably through openings 38 and 50. Various configurations for attaching cap 32 to housing 30 can be used, and in the exemplary embodiment a channel 52 in cap 32 receives an upper edge 54 of housing 30. Sonic welding, adhesive, frictional engagement and the like all can be used to secure cap 32 to housing 30.

Friction cone 34 includes an outer shell 60 and an inner liner 62. Shell 60 can be made of a plastic or other similar material and is shaped to fit in conically shaped housing 30. Liner 62 is rubber, either natural or synthetic such as a thermoplastic or neoprene, with a high coefficient of friction relative to the material of rod 22. Liner 62 is also conically shaped so as to fit within shell 60.

Shell 60 and liner 62 have axial slots 64, 66, respectively extending from one end thereof to the other end thereof. In the exemplary embodiment shown, slots 64 and 66 are aligned one with the other. An axial length of friction cone 34 is slightly less than a length of an interior volume 68 defined by housing 30 so that friction cone 34 can move axially slightly in housing 30, either toward or away from the narrow end of conically shaped volume 68.

Figure 2:
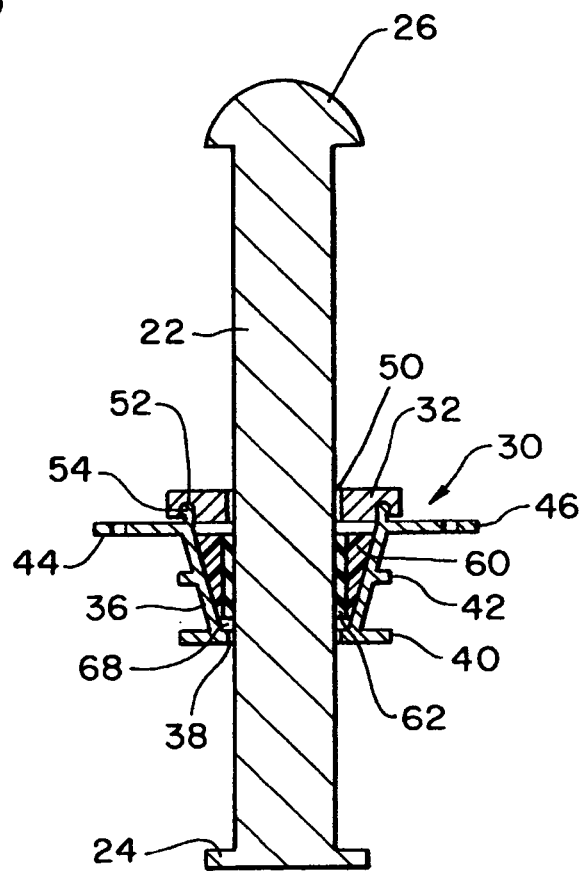
FIG. 2 is a longitudinal cross-sectional view of the linear damper shown in FIG. 1.
Figure 3:
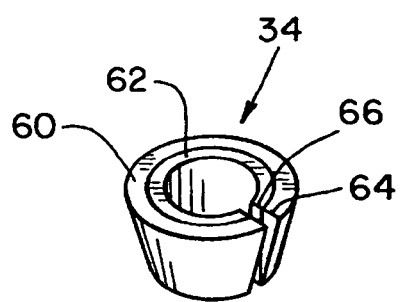
FIG. 3 is a perspective view of a friction cone for the linear damper of the present invention.

The operation of damper 10 will now be described with reference particularly to FIG. 2. With damping assembly 20 in a substantially fixed position, such that housing 30 and cap 32 are relatively immovable, rod 22 is moved axially by apparatus to which it is operatively connected. For example, as cover 16 of console 12 is closed, a portion of the cover pushes against rods 22 of the two dampers 10 shown in FIG. 4. As rod 22 moves downwardly in conically shaped housing 30, moving in a direction from opening 50 in cap 32 toward opening 38 in housing 30, friction cone 34 is dragged downwardly in conically shaped housing 30. Accordingly, as each moves more deeply into the narrowed end of interior volume 68, shell 60 and liner 62 are squeezed, narrowing slightly the openings defined by slits 64, 66. Greater clamping force is applied against rod 22, and the friction of rod 22 against liner 62 resists axial movement of rod 22. Accordingly, damping effect is provided on an object or thing that pushes against rod 22, urging it downwardly in conical housing 30.

When rod 22 is moved in an axial direction opposite to that just described, that is with rod 22 being moved from opening 38 of housing 30 toward opening 50 of cap 32, friction cone 34 is moved upwardly within conical housing 30. Accordingly, shell 60 and liner 62 are each allowed to expand slightly in the wider area of housing volume 68, thereby increasing the widths of slots 64 and 66. Clamping force against rod 22 is released, and minimal resistance to axial movement of rod 22 is provided.

Springs or other return means can be used to move rod 22 to a desired home location. For example, a spring can be used surrounding rod 22 between head 26 and cap 32. Alternatively or conjunctively, a spring can be used operating against base 24 from beneath to move rod 22 upwardly. Other configurations also can be used. For example, the axial end of the rod, such as head 26, can be secured to the device being controlled so that damper 10 provides damping in one direction and in the opposite direction provides little or no damping while rod 22 is being pulled to a desired start position.

Further, while described herein as having damping assembly 20 fixed and rod 22 movable, it should be understood that operation and function of damper 10 requires only relative movement between damping assembly 20 and rod 22. Accordingly, in some installations and uses it may be advantageous for rod 22 to be fixed and for damping assembly 20 to move relative to rod 22. As a further alternative, each damping assembly 20 and rod 22 can move either in opposite directions or in a same direction but at different speeds, such that relative movement occurs between damping assembly 20 and rod 22.

It should be understood that the use of slits 64, 66 and the enablement of axial movement of friction cone 34 in housing 30 enhance both the damping effect that can be generated from clamping forces of liner 62 against rod 22, and the rapid disengagement of clamping force. However, a damper of the present invention can be configured and used with other means for applying a compressive or clamping force of inner liner 62 against rod 22.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A linear damper comprising:
a damping assembly and a rod extending through said damping assembly, said damping assembly and said rod configured and arranged for relative axial movement therebetween, said damping assembly including a housing having a conical surface, said rod having a head and a base on opposite ends thereof, said rod extending completely through said housing such that said head is positioned on one side of said housing and said base is positioned on an opposite side of said housing, said head and said base being configured to prevent said rod from inadvertently moving out of said housing;
said damping assembly including a friction member therein disposed adjacent said rod, said friction member including an outer shell and an inner liner, said inner liner including a smooth inner surface for engagement against said rod, and said outer shell disposed to engage said conical surface of said housing, said outer shell and said inner liner having only a single axial slot from one end to the other end thereof, said slot having a width;
said friction member being moved by movement of said rod in one axial direction to provide clamping force against said rod such that said width of said slot only decreases as said rod moves in said one axial direction, and said friction member being moved by movement of said rod in an opposite axial direction to release clamping force applied against said rod such that said width of said slot increases;
wherein said friction member has an axial length less than an axial length of a space in said housing, and said friction member axially moves in said space in said housing, such that entire outer surface of said outer shell of said friction member remains in complete engagement with said conical surface of said housing as said friction member moves back and forth within said space.

2. The damper of claim 1, wherein said friction member is a conically shaped friction cone.

3. The damper of claim 1, said damping assembly having an axial opening receiving said rod slidably therethrough, and said head and said base being wider than said axial opening.

4. A linear damper comprising:
a conical housing having a continuously uniform tapering sidewall portion; a friction cone disposed for axial movement in said housing against said continuously tapering sidewall portion, said friction cone having a shell and a liner in said shell, said liner including a smooth inner surface, said shell and said liner each having only a single axial slit therein from one end thereof to another end thereof;
a rod extending completely through said friction cone and said housing, said smooth inner surface of said liner being adjacent said rod for sliding engagement with said rod as said rod moves through said friction cone;
said single axially slits of said shell and said liner of said friction cone being expandable and contractible upon axial movement in said conical housing to apply and release clamping pressure against said rod when relative axial movement occurs between said rod and said housing; and
said friction cone being operatively associated with said conical housing and said rod to move within said conical housing upon relative axial movement between said rod and said conical housing, said friction cone moving between a first position engaging said rod for damping resistance upon relative axial movement between said rod and said housing in a first direction, and a second position of reduced damping engagement with said rod upon relative axial movement between said rod and said housing in an opposite direction, such that entire outer surface of said outer shell of said friction member remains in complete engagement with said conical surface of said housing as said friction member moves back and forth within said space.

5. The damper of claim 4, said slits being aligned one with the other.

6. The damper of claim 4, said liner being rubber.

7. A linear damper comprising:
a damping assembly including a conical housing having a tapered inner sidewall defining a first opening at a narrowed end thereof and a cap at an end of said housing opposite said narrowed end, said cap defining a second axial opening therethrough;
a friction cone disposed within said conical housing and axially movable therein, entire outer surface of said friction cone configured to fully slidingly engage said conical housing at all times, said friction cone having only a single axial slit from one end thereof to the other end thereof, said axial slit having a width;
a rod extending completely through said housing, said cap and said friction cone in said housing, said rod being axially moveable relative to said friction cone and said conical housing, said friction cone configured to substantially surround said rod except for that portion of said friction cone having said single axial slit; and
a position of said friction cone in said conical housing being closer to said narrowed end of said conical housing upon relative axial movement between said rod and said housing in a first direction than upon relative axial movement between said rod and said housing in a second direction, such that said width of said axial slit is smaller when said friction cone is closer to said narrowed end of said conical housing as compared to said width of said axial slit when said friction cone is moved away from said narrowed end of said conical housing;
wherein said rod has a head and a base at opposite ends thereof, said head and said base being, respectively, wider than said first and second openings of said damping assembly so that said rod is prevented from undesirably moving completely out of said openings.

8. The linear damper of claim 7, said friction cone including a shell and a liner.

9. The linear damper of claim 8, said shell being plastic and said liner being rubber.

10. The linear damper of claim 8, said shell and said liner each having only a single axial slit therein, said axial slits being aligned so as to form said single axial slit of said friction cone.

11. The linear damper of claim 10, said shell being plastic and said liner being rubber.

* * * * *